(12) United States Patent
Lykke

(10) Patent No.: US 10,981,788 B2
(45) Date of Patent: Apr. 20, 2021

(54) METHOD FOR PRODUCTION OF SULFUR AND SULFURIC ACID

(71) Applicant: HALDOR TOPSØE A/S, Kgs. Lyngby (DK)

(72) Inventor: Mads Lykke, Brønshøj (DK)

(73) Assignee: HALDOR TOPSØE A/S, Kgs. Lyngby (DK)

(*) Notice: Subject to any disclaimer, the term of this patent is extended or adjusted under 35 U.S.C. 154(b) by 0 days.

(21) Appl. No.: 16/652,916

(22) PCT Filed: Nov. 28, 2018

(86) PCT No.: PCT/EP2018/082753
§ 371 (c)(1),
(2) Date: Apr. 1, 2020

(87) PCT Pub. No.: WO2019/105956
PCT Pub. Date: Jun. 6, 2019

(65) Prior Publication Data
US 2020/0317519 A1    Oct. 8, 2020

(30) Foreign Application Priority Data

Nov. 28, 2017  (WO) .................. PCT/EP2017/080721
May 30, 2018   (DK) .................................. 2018 00244

(51) Int. Cl.
*C01B 17/04*    (2006.01)
*C01B 17/79*    (2006.01)
(Continued)

(52) U.S. Cl.
CPC .......... *C01B 17/0447* (2013.01); *C01B 17/79* (2013.01); *C01B 17/803* (2013.01); *B01J 21/04* (2013.01); *B01J 21/063* (2013.01)

(58) Field of Classification Search
CPC . C01B 17/04; C01B 17/0404; C01B 17/0413; C01B 17/0452; C01B 17/0456; C01B 17/74; C01B 17/76; C01B 17/80
See application file for complete search history.

(56) References Cited

U.S. PATENT DOCUMENTS 4,919,912 A    4/1990  Taggart et al.
9,815,693 B2 * 11/2017  Gierman ............... C01B 17/508
(Continued)

FOREIGN PATENT DOCUMENTS

CA    2 154 598 A  *  2/1996  ............. B01D 53/26
CN    104941403 A  *  9/2015  ............. B01D 53/50
(Continued)

OTHER PUBLICATIONS

International Search Report (PCT/ISA/210) dated Mar. 15, 2019, by the European Patent Office as the International Searching Authority for International Application No. PCT/EP2018/082753.
(Continued)

*Primary Examiner* — Timothy C Vanoy
(74) *Attorney, Agent, or Firm* — Buchanan Ingersoll & Rooney P.C.

(57) ABSTRACT

A process plant including a Claus reaction furnace, a means of Claus gas cooling, a Claus conversion section, a means for Claus tail gas oxidation and a sulfuric acid section, wherein a sulfuric acid outlet of the sulfuric acid section is in fluid communication with an inlet of said Claus reaction furnace, as well as a related process. The process has the associated benefit of such a process avoiding undesired production of sulfuric acid, as well as reducing the Claus process gas volume.

27 Claims, 3 Drawing Sheets

Figure 1:
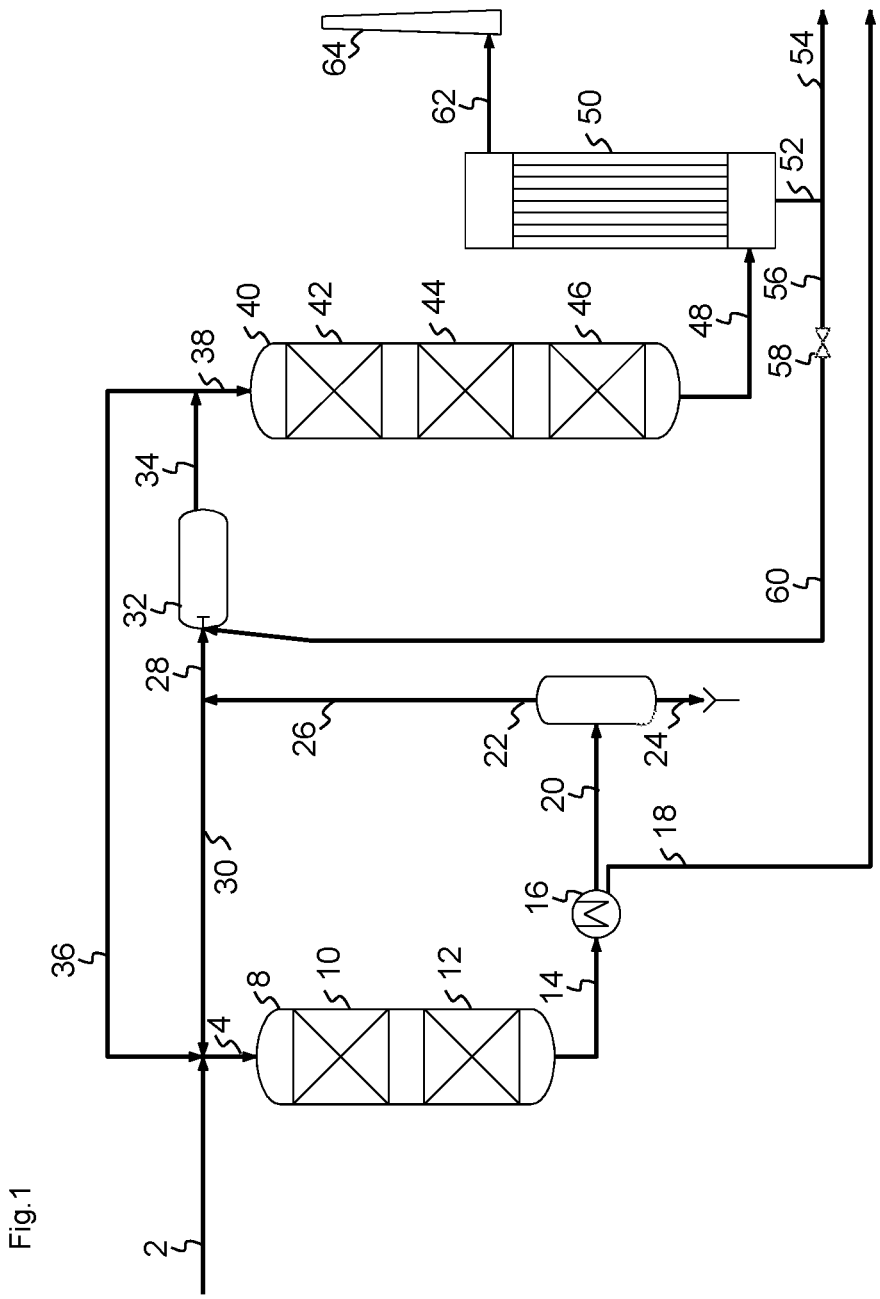

(51) Int. Cl.
  *C01B 17/80*   (2006.01)
  *B01J 21/04*   (2006.01)
  *B01J 21/06*   (2006.01)

(56) References Cited

U.S. PATENT DOCUMENTS

2015/0078984 A1* 3/2015 Thielert .............. C01B 17/0447
                                                423/574.1
2015/0132213 A1* 5/2015 O'Connell .............. C01B 17/04
                                                423/574.1

FOREIGN PATENT DOCUMENTS

| DE | 2 430 909 A1 * | 1/1976 | ............. C01B 17/78 |
| DK | 2018 00057 A * | 9/2019 | ............. C10B 17/00 |
| RU | 116 850 U1 * | 6/2012 | ............. B01D 53/86 |
| WO | 2012152919 A1 | 11/2012 | |
| WO | 2013044937 A1 | 4/2013 | |
| WO | 2017001463 A1 | 1/2017 | |
| WO | 2018096178 A1 | 5/2018 | |
| WO | WO 2018 096 178 A1 * | 5/2018 | ......... C01B 17/0447 |

OTHER PUBLICATIONS

Written Opinion (PCT/ISA/237) dated Mar. 15, 2019, by the European Patent Office as the International Searching Authority for International Application No. PCT/EP2018/082753.

* cited by examiner

METHOD FOR PRODUCTION OF SULFUR AND SULFURIC ACID

The present invention is related to a process for conversion of $H_2S$ to elemental sulfur and sulfuric acid, optionally with an adjustable ratio between elemental sulfur and sulfuric acid.

$H_2S$ is a common side product in many processes, including hydrodesulfurization of refinery streams and production of viscose. It is desirable to convert $H_2S$ prior to emission to the atmosphere as $H_2S$ is highly toxic, odorous and an environmental challenge.

Refinery processes, besides producing the well-known high concentration $H_2S$ gas, may often also produce a so-called sour water stripper gas, which comprises $H_2S$, $H_2O$ and $NH_3$ in almost equal amounts.

Especially in refineries, the chosen process for $H_2S$ abatement has been the Claus process, which has been known and optimized for the more 8 decades. The Claus process proceeds by sub-stoichiometric combustion of $H_2S$ producing $SO_2$ in a Claus reaction furnace, providing a Claus converter feed gas. The subsequent Claus process will convert $H_2S$ and $SO_2$ to form elemental sulfur, which may be condensed and withdrawn.

Typically, the removal efficiency of the Claus process is 95% to 98%, which is insufficient for environmental compliance. Therefore, it is common practice to provide a tail gas treatment after the Claus process to provide sulfur abatement above 99%. The tail gas treatment is often a sulfuric acid plant, which introduces the requirement for handling of sulfuric acid.

It has now been identified that the sulfuric acid may be recycled to the Claus reaction furnace, where it may contribute to the formation of sulfur, and in addition provide opportunities for optimization of the Claus process size and operational cost.

In WO 2012/152919 A1, a sulfuric acid process for treatment of Claus tail gas is presented in which the conversion of $H_2S$ to $H_2SO_4$ in a Claus tail gas is described. The steps in the process are:
1. Sub-stoichiometric oxidation
2. Claus conversion
3. Oxidation of reduced sulfur species ($H_2S$) in the Claus tail gas in oxygen rich atmosphere at 400-700° C.
4. Catalytic oxidation of $SO_2$ to $SO_3$
5. Condensation of $H_2SO_4$ It is recognized that the $H_2SO_4$ product is not always desirable and it is suggested to recycle the sulfuric acid to an upstream Claus reaction furnace or the $H_2S$ oxidation step as described above. However, the recycling of sulfuric acid is merely thought as an abatement of sulfuric acid, and the consequences of recycling the $H_2SO_4$ on the WSA® or Claus process have not been evaluated, i.e. it is not recognized that $H_2SO_4$ recirculation requires a reduction in the amount of $O_2$ directed to the Claus reaction furnace, nor are the beneficial effects on the Claus and sulfuric acid process realized. This is especially the case when highly concentrated sulfuric acid is recycled from the sulfuric acid plant.

In WO 2012/152919 A1 it is also recognized that support fuel may be required in both the Claus reaction furnace and $H_2S$ oxidation step to obtain the desired operating temperature, without realizing the beneficial effects of using feedstock gases as support fuel for the $H_2S$ oxidation in the sulfuric acid process.

The proposal to recycle $H_2SO_4$ to the Claus reaction furnace will therefore in itself not provide a working process, but require additional process modifications.

According to the present invention a process for conversion of $H_2S$ to elemental sulfur with increased efficiency is presented, in which a Claus process is combined with a sulfuric acid process. In addition, the synergy of optimally combining the two processes is realized. According to this process, sulfuric acid produced in the sulfuric acid process, treating the Claus tail gas, is recycled to the Claus reaction furnace for decomposition and elemental sulfur production.

For the purpose of the present application, a stoichiometric amount of oxygen shall be defined under the assumption that the products derived from N, H, C, S and O in the feed gas are $N_2$, $H_2O$, $CO_2$ and $SO_2$. If less than a stoichiometric amount of oxygen is present (also called sub-stoichiometric), this mean that not all feed components are fully oxidized. For a Claus plant gas feed, this means that the process gas after substoichiometric combustion/reaction will contain unconverted $H_2S$, $NH_3$ and hydrocarbons from the feed stream(s) and $H_2$, CO, COS, $SO_2$ and $CS_2$ formed in the $O_2$ deficit environment.

For the purpose of the present application, a fuel shall be defined as a composition which, when oxidized with $O_2$ will form $N_2$, $H_2O$, $CO_2$ and $SO_2$ as the reaction product and release a substantial amount of energy by the reactions. A mixture of hydrocarbons (e.g. natural gas, with $CH_4$ and $C_2H_6$) as well as $H_2S$ is a typical fuel gas, but the fuel gas could also comprise CO, $NH_3$ and $H_2$.

For the purpose of the present application, oxygen ($O_2$) is understood as a stream containing $O_2$, such as air, enriched air and pure oxygen, but could also be a process gas containing $O_2$.

For the purpose of the present application, the Claus stoichiometric amounts of $H_2S$ and $O_2$ corrected for oxidation to species other than $H_2S$ and $SO_2$ shall be calculated from the theoretical O requirement assuming Claus process stoichiometry and the unfulfilled $O_2$ consumption due to partially oxidized products (other than $H_2S$ and $SO_2$).

For the purpose of the present application, the unit wt % shall designate weight/weight % and the unit vol % shall designate volume/volume %.

For the purpose of the present application, where concentrations in the gas phase are given, they are, unless otherwise specified, given as volume/volume concentration.

Sulfur species in the inlet are assumed to be oxidized according to the net Claus reactions, in average consuming one 0 atom per S atom. Nitrogen atoms are assumed to involve no O consumption. Hydrocarbon species are assumed to involve consumption of 2 O atoms per C atom and ½ O atom per H atom:

$$n_{O,Claus} = 2n_C + \tfrac{1}{2} n_H + n_S$$

The oxygen consumption shall be corrected due to incomplete oxidation according to the required oxygen consumption for completely oxidizing products to theoretical end products, e.g. $COS+3/2O_2$ to $CO_2$ and $SO_2$. The products of incomplete oxidation presented here are merely examples and are not to be considered a complete list.

$$n_{O,incomplete} = 3n_{COS} + 6n_{CS_2} + n_{CO}$$

$$n_{O_2,corrected} = \tfrac{1}{2}(n_{O,Stoichiometric} - n_{O,incomplete})$$

$$c_{O_2,corrected} = \tfrac{1}{2}(n_{O,Stoichiometric} - n_{O,incomplete})/n_{total}$$

The corrected oxygen consumption in the Claus process may in practice be evaluated from analysis of the volumes and compositions of streams to and from the Claus section of a process plant, possibly in combination with volumes and compositions of other streams.

In a broad aspect the present invention relates to a process for production of sulfur from a feedstock gas comprising 30 vol %, 40 vol % or 50% to 99 vol % or 100 vol % $H_2S$ and a recycled stream of sulfuric acid involving the steps of a. providing a Claus reaction furnace feed stream comprising said feedstock gas, an amount of recycled sulfuric acid, an amount of oxygen and optionally an amount of fuel, wherein the amount of oxygen is substoichiometric,
b. directing said Claus reaction furnace feed stream to a Claus reaction furnace operating at elevated temperature, such as above 900° C., providing a Claus converter feed gas
c. cooling said Claus converter feed gas to provide a cooled Claus converter feed gas and and optionally an amount of elemental sulfur
d. directing said cooled Claus converter feed gas to contact a material catalytically active in the Claus reaction,
e. withdrawing a Claus tail gas and elementary sulfur, optionally by cooling the effluent from said material catalytically active in the Claus reaction,
f. directing a stream comprising said Claus tail gas, oxygen, and a fuel, as a feedstock gas to a means for Claus tail gas oxidation operating at a temperature above 900° C. and/or a catalytic means for oxidation, providing an $SO_2$ rich converter feed gas,
g. cooling said $SO_2$ rich converter feed gas, providing a cooled $SO_2$ converter feed gas
h. directing said $SO_2$ converter feed gas to contact a material catalytically active in $SO_2$ oxidation to $SO_3$, providing an $SO_3$ rich gas,
i. converting said $SO_3$ rich gas to concentrated sulfuric acid and a $SO_3$ depleted gas, either by absorption of $SO_3$ in sulfuric acid or by hydration of $SO_3$, cooling and condensation of sulfuric acid, wherein said recycled stream of sulfuric acid comprises an amount of said concentrated sulfuric acid and wherein the concentrated sulfuric acid contains from 90% w/w to 98% w/w or 98.5% w/w $H_2SO_4$, with the associated benefit of such a process having a high conversion and thermal efficiency and avoiding undesired formation of sulfuric acid. The use of a Claus reaction furnace and a means for Claus tail gas oxidation operating above 900° C. has the effect of ensuring complete conversion of the constituents present, and this may optionally require the presence of a fuel in addition to the feedstock gas. In addition, homogeneous Claus reactions will take place in the Claus reaction furnace, such that sulfur may be withdrawn when the Claus converter feed gas is cooled. The stream fed to the means for Claus tail gas oxidation may typically include $H_2S$ as fuel from the Claus tail gas and/or a separate stream comprising $H_2S$, hydrocarbon or other fuels. In addition to the mentioned process steps the process may include further steps such as heat exchange for changing the temperature (or in other ways conditioning the process streams) to an appropriate range for the processes occurring.

In a further embodiment the Claus reaction furnace feed stream comprises less than 0.1 wt % non-elemental nitrogen, such as $NH_3$, with the associated benefit of avoiding formation of e.g. ammonia salts which may plug the Claus condenser(s).

In a further embodiment the Claus reaction furnace feed stream comprises less than 50 vol %, 20 vol %, 10 vol % or 1 vol % $N_2$ with the associated benefit of providing a process with a high temperature in the Claus reaction furnace, and a reduced process gas volume, due to the reduced presence of $N_2$. This can be accomplished by using pure $O_2$ or oxygen enriched air as the oxygen source.

In an alternative process, steps d and e are carried out sequentially 2-5 times, with the associated benefit of enabling a higher conversion in the process when multiple Claus process steps are carried out, by shifting the equilibrium towards the product side, when sulfur is withdrawn.

In an alternative process, step g is carried out sequentially 2-5 times, at a temperature between 380° C. and 450° C., with intermediate cooling and typically also cooling between step g and h, with the associated benefit of shifting the equilibrium of the exothermal process towards the products, thus enabling a higher conversion in the process when multiple $SO_2$ oxidation beds are operating at the optimal temperature.

In a further embodiment the $H_2S:SO_2$ ratio of said Claus tail gas is above 2, preferably from 2.5 or 5 to 10 or 20, with the associated benefit of such a feed gas providing a $H_2S$ containing Claus tail gas to the means for Claus tail gas oxidation. Such a feed gas containing an elevated amount of $H_2S$ minimizes the need for fuel gas addition as the $H_2S$ oxidation releases a substantial amount of energy, whereas $SO_2$ does not release energy in the means for Claus tail gas oxidation. Such a composition of the tail gas, may be obtained if the $H_2S:SO_2$ ratio of the Claus converter feed gas slightly above 2:1.

In a further embodiment the $H_2S:SO_2$ ratio of said Claus tail gas is below 2, preferably from 0.05 or 0.1 to 1 or 1.8, with the associated benefit of having a substantially $H_2S$ free Claus tail gas. In the downstream sulfuric acid plant such a substantially $H_2S$ free Claus tail gas can be an advantage as the $SO_2$ will not oxidize without a $SO_2$ conversion catalyst and thus it will be possible to preheat the Claus tail gas with a combination of catalytic $H_2S$ oxidation (controlled bypass of feedstock gas containing $H_2S$) and process gas recycle around the catalytic $H_2S$ oxidation, such that the temperature increase across the $H_2S$ oxidation catalyst can be closely controlled. With unknown and/or varying $H_2S$ concentration in the Claus tail gas, the risk of overheating the $H_2S$ oxidation catalyst is high. Such a composition of the tail gas, may be obtained if the $H_2S:SO_2$ ratio of the Claus converter feed gas slightly below 2:1.

In a further embodiment the process further comprises the step of directing an amount of a further feedstock gas to said means for Claus tail gas oxidation, with the associated benefit of providing additional sulfur and fuel to the sulfuric acid process. The further feedstock gas may comprise impurities, which may be incinerated prior to the treatment in the sulfuric acid process, and/or hydrogen sulfide and other fuels which may contribute to the sulfuric acid production and the combustion in the means for Claus tail gas oxidation. If the further feedstock gas comprises a high amount of inert gases or sulfur free fuels, the process also has the benefit of avoiding an increase in Claus converter size due to a non-contributing flow. The further feedstock gas may originate from the same source as the feedstock gas or it may originate from a different source.

In a further embodiment said further feedstock gas comprises more than 5 vol % non-elemental nitrogen, such as $NH_3$, with the associated benefit of enabling a process where the non-elemental nitrogen constituents, which may be difficult to oxidize in the sub-stoichiometric atmosphere of the Claus reaction furnace, can be directed to the means for Claus tail gas oxidation. Such a process may be especially beneficial if the further feedstock gas is a sour water stripper (SWS) gas comprising $H_2S$, $NH_3$ and $H_2O$—of which only $H_2S$ is desired in the Claus process, and $NH_3$ is problematic in the Claus process due to potential plugging by ammonia salt. Instead such an SWS gas may be directed to the sulfuric acid plant, where it is well known to handle $NH_3$.

In a further embodiment the amount of sulfur in the further feedstock gas is at least 1 wt %, 2 wt % or 5 wt % of the total amount of elemental sulfur withdrawn from the process, with the associated benefit of such a feedstock gas being able to provide thermal energy while also contributing to the sulfur abatement.

In a further embodiment the material catalytically active in the Claus reaction comprises activated aluminum(III) oxide or titanium(IV) oxide with the associated benefit of such a material providing an efficient process for production of elemental sulfur.

In a further embodiment step (d) is carried out under a pressure of 200 mbar g to 700 mbar g, a temperature of 200° C. to 350° C. and a space velocity of 800 $Nm^3/h/m^3$ to 3000 $Nm^3/h/m^3$, with the associated benefit of such conditions being efficient for the production of elemental sulfur.

In a further embodiment step (d) is carried out at a temperature of 100° C. to 150° C. and step (e) involves the step of periodically heating said material catalytically active in the Claus reaction to allow withdrawal of condensed elementary sulfur in a liquid or gas phase, with the associated benefit of the low temperature being beneficial for achieving very high conversion of $SO_2$ and $H_2S$ into elemental sulfur, both due to the low temperature but also since the reaction product is removed, providing even better conditions for high conversion.

In a further embodiment said material catalytically active in conversion of $SO_2$ to $SO_3$ comprises vanadium, with the associated benefit of such a material providing an efficient process for production of sulfuric acid.

In a further embodiment said step (h) is carried out under a pressure of 50 mbar g to 200 mbar g, a temperature of 380° C. to 520° C. and a space velocity of 800 $Nm^3/h/m^3$ to 1500 $Nm^3/h/m^3$, per catalyst bed, with the associated benefit of such conditions being efficient for the oxidation of $SO_2$ to form $SO_3$.

In a further embodiment the amount of sulfur in the recycled stream of sulfuric acid is higher than 1 wt %, 3 wt % or 5 wt % and less than 17 wt %, 21 wt % or 25 wt % of the total amount of elemental sulfur withdrawn from the process. A recycle above the lower limits has the benefit of providing the effect of reduced process gas volume, while the recycle being less than the upper limits avoids a situation where additional fuel must be added to the Claus reaction furnace, resulting in extra process volume and operational cost. Especially where the oxygen source to the Claus reaction furnace is oxygen enriched air, a high ratio between recycled sulfuric acid and elemental sulfur withdrawn is beneficial, such as above 10%.

In a further embodiment the sulfuric acid in the recycled stream of sulfuric acid is atomized in said Claus reaction furnace either using two fluid nozzles driven by compressed air, $N_2$ or steam or using hydraulic nozzles and wherein the residence time in the Claus reaction furnace is from 1.5 second to 4 seconds, with the associated benefit of such nozzles providing atomization to small droplets and such residence times being sufficient for complete evaporation of sulfuric acid droplets.

In a further embodiment the molar ratio $H_2S:O_2$ of the combined streams directed to the Claus reaction furnace is at least 2.5, with the associated benefit of such a low oxygen feed enabling sub-stoichiometric partial conversion of $H_2S$ to $SO_2$, from the contribution from thermal dissociation of $H_2SO_4$, providing the remaining oxygen to obtain the desired $H_2S:SO_2$ ratio of 2.0 in the Claus converter feed gas.

In a further embodiment the molar ratio $H_2S:O_2$ of the combined streams directed to the Claus reaction furnace corrected for other oxygen consuming species in the feedstock and corrected for products of incomplete oxidation in the Claus tail gas is greater than 2.1, 2.2 or 2.5, with the associated benefit of the remaining required oxygen atoms being provided from sulfuric acid, such that the molecular oxygen directed to the process is reduced, and thus, compared to full supply of oxygen from atmospheric air, less inert nitrogen is provided with an associated decrease in process gas flow.

In a further embodiment an amount of gas in the process is optionally cooled and directed to an upstream position for controlling a process temperature, with the associated benefit of enabling active control of the temperature of the highly exothermic processes. Cooling may not be necessary if the gas is already at a lower temperature than the temperature at the upstream position.

In a further embodiment one or more streams directed to said Claus reaction furnace are pre-heated by heat exchange with a hot process stream, with the associated benefit of minimizing or avoiding the requirements for support fuel to achieve the desired temperature for evaporation of sulfuric acid and conversion of the feedstocks.

In a further embodiment one or more streams directed to said means for Claus tail gas oxidation are pre-heated by heat exchange with a hot process stream with the associated benefit of minimizing or avoiding the requirements for support fuel to achieve the desired temperature for combustion and subsequent oxidation of $SO_2$.

In a further embodiment said material catalytically active in $SO_2$ oxidation to $SO_3$ comprises vanadium, with the associated benefit of such a material having a high activity for oxidation of $SO_2$.

In a further embodiment condensation of sulfuric acid according to step (h) is carried out in a condenser where cooling medium and $SO_3$ rich gas is separated by glass, with the associated benefit of condensation of sulfuric acid being carried out in equipment which is robust against corrosion. The glass may specifically be borosilicate glass. The glass may either be in the form of horizontal glass tubes enclosing the cooling medium, or vertical glass tubes enclosing the $SO_3$ rich gas and condensed sulfuric acid. The cooling medium may preferentially be a process gas intended for a process operating at elevated temperature, and thus benefitting from receiving pre-heated process gas, such as the Claus tail gas directed to the means of Claus tail gas oxidation or oxidant being directed to one or both of the Claus furnace or the means of Claus tail gas oxidation.

In a further embodiment at least one of said catalytically active materials for oxidation of $SO_2$ to $SO_3$ or $H_2S$ to elemental sulfur and/or at least one product withdrawn from one of said catalytically active materials are cooled by heat exchange, such as interbed heat exchange or an internally cooled catalytic reactor, with the associated benefit of enabling active control of the temperature of the highly exothermic processes by interbed heat exchange or an internally cooled catalytic reactor such as a boiling water reactor, having a tubular or a thermoplate cooling circuit.

In a further embodiment the amount of recycled sulfuric acid is selected such that the temperature in the Claus reaction furnace is from 800° C., 900° C. or 1000° C. to 1300° C., 1400° C. or 1500° C., without addition of support fuel to the Claus reaction furnace, with the associated benefit of this temperature range being sufficient for oxidation of impurities in the feedstock under sub-stoichiometric conditions, while being sufficiently low to avoid excessive costs of materials. The amount of recycled sulfuric acid may be controlled either in a control loop, as a function of measured temperature or from process design according to a calculated material and thermal balance.

A further aspect of the present invention relates to a process plant comprising a Claus reaction furnace, a means of Claus gas cooling, a Claus conversion section, a means for Claus tail gas oxidation and a sulfuric acid section, wherein the Claus reaction furnace has an inlet and an outlet, the means of Claus gas cooling has a gas inlet, a gas outlet and optional an elemental sulfur outlet, the Claus conversion section has a gas inlet, a gas outlet and an elemental sulfur outlet, the means for Claus tail gas oxidation has a process gas inlet, an Claus tail gas oxidant inlet, and optionally a further feedstock inlet and a process gas outlet and the sulfuric acid section has a gas inlet, a gas outlet and a sulfuric acid outlet, and wherein the inlet of the Claus reaction furnace is configured for receiving a feedstock gas, sulfuric acid, fuel and a Claus reaction furnace oxidant, and the outlet of the Claus reaction furnace is configured for being in fluid communication with the inlet of the means of Claus gas cooling, wherein the outlet of the means of Claus gas cooling is configured for being in fluid communication with the inlet of the Claus conversion section and wherein the Claus tail gas inlet of the means for Claus tail gas oxidation is configured for being in fluid communication with the outlet of said Claus conversion section gas outlet, the process gas outlet of the means for Claus tail gas oxidation is configured for being in fluid communication with the inlet of the sulfuric acid section, characterized further in the sulfuric acid outlet of the sulfuric acid section being in fluid communication with the inlet of said Claus reaction furnace, with the associated benefit of such a process avoiding undesired production of sulfuric acid, as well as reducing the process gas volume.

In a further embodiment said sulfuric acid section comprises a sulfur dioxide oxidation reactor having an inlet and an outlet and a sulfuric acid condenser having a process side having a process gas inlet, a process gas outlet and a sulfuric acid outlet and a cooling medium side, having a cooling medium inlet and a cooling medium outlet, and wherein the sulfuric acid condenser optionally is configured for at least one of the Claus reaction furnace oxidant and the Claus tail gas oxidant to be pre-heated by being directed to the inlet of the cooling medium side of the sulfuric acid condenser and being withdrawn from the outlet cooling medium side of the sulfuric acid condenser, with the associated benefit of such a process plant being highly energy efficient and highly efficient in removing sulfur from the process gas.

In a further embodiment the process plant further comprises at least one heat exchanger having a hot heat exchanger side and a cold heat exchanger side, configured for the cold heat exchanger side pre-heating one of said feedstock gas, sulfuric acid and oxidant prior to being directed to said means of Claus tail gas oxidation and for the hot heat exchanger side being configured for cooling a hot process stream, with the associated benefit of increasing the energy efficiency of the process plant. The heat exchanger may either be of the gas/gas heat exchanger type or utilizing a steam circuit or another heat exchange medium.

In a further embodiment the hot process stream is taken from the group consisting of the stream of the outlet from the means for Claus tail gas oxidation, the stream of the outlet from the Claus reaction furnace and the stream of the outlet from the sulfur dioxide oxidation reactor, with the associated benefit of providing energy efficiency.

In a further embodiment the Claus reaction furnace comprises one or more atomization nozzles, preferably two fluid atomization nozzles or hydraulic atomization nozzles, configured for adding sulfuric acid to the Claus reaction furnace as droplets, with the associated benefit of the sulfuric acid droplets being small, and thus evaporating rapidly and completely.

In a further embodiment the process plant further comprises a means of $SO_3$ reduction, having an inlet and an outlet configured for the inlet of the means of $SO_3$ reduction being in fluid communication with the outlet of the Claus reaction furnace and for the outlet of the means of $SO_3$ reduction being in fluid communication with the inlet of the Claus conversion section, with the associated benefit of such a means efficiently avoiding directing sulfuric acid $SO_3$ or $O_2$ to contact the catalytically active material in the Claus conversion section. The means of $SO_3$ reduction may preferably be a catalytically active material, comprising e.g. one or more compounds of V, Mn, Fe, Co, Cu, Zn, Ni, Mo, W, Sb, Ti and Bi supported on one or more compounds of Al, Ti, Si, diatomaceous earth, Zr, Mg, and cordierite. The means of $SO_3$ reduction may be positioned in a separate reactor, a separate reactor bed or as a layer of catalytically active material on top of the material catalytically active in the Claus reaction.

The present invention describes a combination of a Claus and sulfuric acid process, which effectively can produce the amount of sulfuric acid required by a process plant or even avoid production of sulfuric acid and convert excess sulfuric acid to elemental sulfur which may be transported to other sites.

For maximum conversion to elemental sulfur, ⅓ of the $H_2S$ must be converted to $SO_2$.

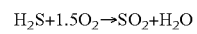

The stoichiometric ratio between $H_2S$ and $SO_2$ is controlled by controlling the amount of oxygen in the Claus reaction furnace. Oxygen is typically supplied by atmospheric air, but can also be $O_2$ enriched air or even pure $O_2$.

The oxygen addition to the Claus reaction furnace must also take into account the amounts of $NH_3$, CO, $H_2$ and hydrocarbons in the feed streams.

If the combustion temperature in Claus reaction furnace is less than 1100° C. the conversion of e.g. $NH_3$ may be incomplete. The consequence of this will be a Claus converter feed gas having a potential for formation of ammonia salts, such as $(NH_4)_2SO_4$ and $(NH_4)_2S_2O_3$ which may plug the Claus condenser.

The partially oxidized Claus converter feed gas is then converted to elemental sulfur by the following reactions at a temperature typically above 200° C. in the presence of a catalytically active material, such as activated aluminum(III) oxide or titanium(IV) oxide.

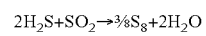

Often 3-4 Claus converters are operated in series, to increase the conversion to a maximum, which will increase the cost of a Claus plant.

The control of temperature in the Claus process is important to ensure that elemental sulfur formed in catalytic converter remains gaseous, such that it is condensed in the desired process position only. As the Claus reaction is exothermic, a further restriction is related to the fact that as the Claus process is exothermic it is beneficial to operate at low temperatures.

An alternative to the above process is the so-called sub-dewpoint Claus process, in which the material catalytically active operates at temperatures where elemental sulfur is not on the gas phase. Such a sub-dewpoint Claus process will require an appropriate scheme for withdrawal of condensed sulfur, e.g. by pulsing of the temperature and purging of elementary sulfur by an inert gas.

Even with 3-4 Claus converters/condensers/reheaters in series it is not possible to reach more than ~98% sulfur recovery, which is insufficient to comply with most environmental legislations. Therefore, the Claus plant is typically equipped with a so-called Claus tail gas solution, where the above mentioned sub-dewpoint process is an example. Numerous tail gas processes exist, having different features. To achieve very high removal efficiencies these Claus tail gas plants become complicated and approach the same cost as the Claus plant itself.

The produced elemental sulfur, does typically not have a direct use in the plants producing the $H_2S$ containing waste stream, but elemental sulfur is simple to transport to other sites and to store for prolonged periods.

A common alternative to the Claus process is the conversion of $H_2S$ to sulfuric acid, e.g. by the so-called Wet Sulfuric Acid (WSA®) process. The sulfuric acid produced may be used in other chemical processes in the plant. A WSA® process may also constitute the tail gas cleaning of a Claus process plant. A similar dry sulfuric acid process may also find use in this relation.

The sulfuric acid processes oxidize $H_2S$ to $SO_2$ and the $SO_2$ into $SO_3$ and subsequently hydrate $SO_3$ into sulfuric acid, either by reaction with water in the gas phase in the so-called wet sulfuric acid process (WSA® process) or by absorption in concentrated sulfuric acid in the so-called contact process or dry process. The reaction temperature during oxidation of $SO_2$ to $SO_3$ will be in the range 400-500° C., in the presence of a catalytically active material, typically comprising vanadium. Typically, the wet sulfuric acid processes produce sulfuric acid having a concentration in the range 92%-98%, whereas dry sulfuric acid processes may also produce sulfuric acid having a concentration in excess of 98%.

In addition, it may also be attractive to collect high pressure steam in the range from 30 barg to 80 barg from the highly exothermic sulfuric acid processes, whereas the Claus process will only provide steam of lower pressure and in significantly lower amounts.

Production of large amounts of sulfuric acid may, however, be less attractive, even though sulfuric acid is traded commercially, as transport of sulfuric acid is complex and regulated.

The reactions taking place in a sulfuric acid process (dry and wet) are $$H_2S+1.5O_2 \rightarrow SO_2+H_2O$$

$$SO_2+0.5O_2 \rightarrow SO_3$$

$$SO_3+H_2O \rightarrow H_2SO_4.$$

The overall reaction of the sulfuric acid process can be described according to $$H_2S+2O_2 \rightarrow H_2SO_4$$

The WSA® process as an ordinary Claus tail gas solution provides a solution that fulfills the environmental regulations at both lower capital and operating cost than the alternatives. The only disadvantage of the WSA® process, so far, has been the sulfuric acid product that is not always desirable. With the new invention, an integrated Claus+WSA® process will remove this disadvantage, and at the same time reduce plant size of both the Claus and WSA® process.

It has now been realized that the integration of the Claus process and sulfuric acid process may also be carried out by recycle of all or substantially all produced sulfuric acid to the Claus reaction furnace. Combustion of sulfuric acid is known from regeneration of spent sulfuric acid in a wet sulfuric acid plant, but has not been practiced in the Claus reaction furnace, i.e. the combustor of the Claus process. By combustion/decomposition of sulfuric acid at elevated temperature, the following reaction takes place:

$$H_2SO_4 \rightarrow H_2O+SO_2+\tfrac{1}{2}O_2$$

The sulfuric acid will not decompose before it is evaporated and heated up to >600° C. To allow for sufficient time for droplet evaporation it is recommended to design the combustion chamber with at least 2 seconds residence time, whereas normal Claus reaction furnaces with only gas phase reactions usually are designed for 1 second residence time.

The atomization media is preferably compressed air, as oxygen will also be supplied to the process gas. An alternative is pressure nozzles or hydraulic nozzles.

If all sulfuric acid produced in the sulfuric acid process downstream the Claus process is directed to the Claus reaction furnace, it is possible to operate a Claus process in which the $H_2S$ abatement employs the very high removal efficiency as well as thermal efficiency of the sulfuric acid plant, but in which the product is sulfur, which is simple to handle and transport.

In addition, by the recycle of sulfuric acid, $O_2$ is released by the decomposition of $H_2SO_4$, such that the amount of added combustion oxidant will be reduced, which, if the oxidant is atmospheric air, has the benefit of reducing the process volume dramatically, since atmospheric air comprises close to 80% inert $N_2$, i.e. 4 volumes of $N_2$ per volume of $O_2$.

The overall Claus reaction, based on air as $O_2$ carrier to the Claus reaction furnace is:

$$4H_2S+2O_2+8N_2 \rightarrow 2S_2+4H_2O+8N_2$$

Similarly, the overall Claus reaction, based on $H_2SO_4$ as the oxygen carrier to the Claus reaction furnace is:

$$3H_2S+H_2SO_4 \rightarrow 2S_2+4H_2O$$

Comparing the two reactions, it is evident that $H_2SO_4$ is an excellent $O_2$ carrier and has the (theoretical) potential to reduce the Claus tail gas volume flow by 67% compared to atmospheric air.

The reaction above is based on 100% w/w $H_2SO_4$, which for practical reasons is impossible to obtain when producing sulfuric acid from the Claus tail gas, which is characterized by having a very high $H_2O$ concentration (20-35 vol %). $H_2SO_4$ is hygroscopic and will absorb water from the gas phase. As a consequence, weak $H_2SO_4$ e.g. 45% w/w may be produced in a Claus tail gas sulfuric acid plant. 45% w/w $H_2SO_4$ correspond to a molar $H_2SO_4:H_2O$ ration of 1:6.7, as the remaining 55% w/w is $H_2O$ and thus the reaction with $H_2SO_4$ as oxygen carrier becomes $$3H_2S+H_2SO_4+6.7H_2O \rightarrow 2S_2+10.7H_2O$$

One can define α, an inert process gas to elemental sulfur ratio, as:

$$\alpha = \frac{\text{moles of inert process gas}}{\text{moles of } S_2}$$

For the overall Claus reaction, using atmospheric air as the oxygen carrier, $\alpha$ is 6 and with 100% w/w $H_2SO_4$ as oxygen carrier the $\alpha$ value is 2, i.e. significantly less inert process gas (primarily $N_2$ and $H_2O$) is formed with $H_2SO_4$ as the oxygen carrier.

With 45% w/w $H_2SO_4$ added to the thermal stage of the Claus plant, the $\alpha$ value becomes 5.35—a value not far from the use of atmospheric air.

In the WSA® process, sulfuric acid concentrations >90% w/w $H_2SO_4$ are easily obtainable without a dedicated sulfuric acid concentration column, even with the high $H_2O$ concentrations as found in the Claus tail gas. With 95% w/w $H_2SO_4$, the $\alpha$-value becomes 2.15, i.e. close to the theoretical minimum and far better than the 45% w/w $H_2SO_4$.

Another important aspect of the addition of sulfuric acid to the thermal stage of the Claus plant is the energy balance as a minimum temperature of around 900-1,000° C. is required in the thermal stage to ensure destruction of impurities, such as $CH_4$, in the feed gas. The overall Claus reaction using atmospheric air as oxygen source is exothermal and thus contributes to reach a high operating temperature. Sulfuric acid, however, requires energy for the evaporation of the $H_2SO_4$ and $H_2O$ and the Claus reaction itself is endothermal, i.e. effectively cooling the thermal stage. Besides diluting the Claus process gas, the extra water in the sulfuric acid also further cools the thermal stage and thus limits the amount of sulfuric acid that can be added. Alternatively, fuel gas has to be added to supply thermal energy to the system, increasing Claus process gas flow and cost of operation.

The preferred recycle flow of H2SO4 is determined by the amount of sulfur fed to the downstream Claus tail gas oxidation unit, i.e. sum of sulfur in the tail gas and other WSA feed streams, and the sulfur recovery in the WSA unit. As the sulfur recovery in the WSA unit will typically be higher than 90% most of the sulfur in the feed will be recycled to the Claus furnace.

Increased flow of H2SO4 into the Claus reaction furnace will reduce the combustion air requirement and hence the process gas flow outlet the Claus reaction furnace until the point where support fuel is needed to keep the required temperature in the reaction furnace.

Hence the optimal sulfur recovery in the Claus plant, sum of sulfur in tail gas and bypass gas to WSA, is where the temperature in the Claus reaction furnace can be maintained in the preferred range at between 800° C. and 1400° C. without having to add heat by fuel gas or take measures to cool the reaction furnace.

It may also be beneficial to by-pass an amount of feedstock gas to the means for Claus tail gas oxidation, since the feedstock gas has a high calorific value, which may be used in the means for Claus tail gas oxidation, and thus reduce the requirement for addition of support fuel. This may be even more beneficial if two sources of feedstock gas exist, such that one feedstock gas free of $NH_3$ and another feedstock gas containing $NH_3$, since the sub-stoichiometric conditions in the Claus reaction furnace makes it hinders complete oxidation of $NH_3$. So-called Sour Water Stripper (SWS) gases is an example of such an $NH_3$ containing feed stock gas.

In Claus processes for treatment of SWS gas, the complete destruction of $NH_3$ in the Claus reaction furnace is crucial, otherwise ammonia salts such as $(NH_4)_2SO_4$ and $(NH_4)_2S_2O_3$ will form and plug the final sulfur condenser. Special high intensity (two-stage) burners are able to reach the high temperatures needed for thermal $NH_3$ destruction, but require accurate control of oxygen in two separate streams.

However, it is well known to treat SWS gas in a sulfuric acid plant, since complete oxidation of $NH_3$ to $N_2$ and NO is obtained with excess oxygen. Therefore, it may be desirable to configure an integrated Claus+sulfuric acid process with two combustors for directing a first feedstock comprising $H_2S$ and little or no $NH_3$ to the Claus reaction furnace while directing a gas comprising $NH_3$, such as SWS gas, to the means for Claus tail gas oxidation. In such a configuration it may be desirable to design the sulfuric acid plant to include a section for selective catalytic reduction (SCR) of $NO_x$.

The integrated process according to the present disclosure may also benefit from the use of oxygen enriched air or substantially pure oxygen in the Claus reaction furnace. The use of oxygen enriched air has the benefit of reducing the amount of inert nitrogen in the process gas, and thus reducing the process gas volume and thus reduce plant size. The absence of dilution by nitrogen also has the effect of increasing the combustion temperature, which may be beneficial if impurities are present which need complete conversion, especially since the amount of oxygen in the Claus reaction furnace is sub-stoichiometric. Since the Claus catalyst is sensitive to presence of impurities, such as light hydrocarbons it may often be beneficial to operate the Claus reaction furnace with oxygen enriched air to achieve an elevated temperature for complete oxidation of impurities. This also has the further benefit of enabling an initial homogeneous non-catalytic Claus conversion, which may take place at temperatures above 900° C.

From a thermal efficiency perspective, the high combustion temperature may however be limited by the choices of construction materials in the Claus reaction furnace and downstream waste heat boiler. For highly concentrated $H_2S$ feed gases, oxygen enrichment may increase the process gas temperature above the design temperatures for the materials. A combination of $H_2SO_4$ recycle (which cools the process gas by evaporation and acid decomposition) will however make use of enriched $O_2$ in such a layout possible.

The means for Claus tail gas oxidation will typically be operated with atmospheric air, and in addition it may also be beneficial to direct gases with a low concentration of sulfur species to the means for Claus tail gas oxidation as complete combustion of the sulfur species release considerably more energy than the partial oxidation taking place in the Claus reaction furnace.

As a consequence, it may be beneficial to direct feedstock gases comprising high concentrations of $H_2S$ to the Claus plant, while by-passing the less concentrated feedstock gases as well as feedstock gases comprising $NH_3$ to the means for Claus tail gas oxidation.

If the means for Claus tail gas oxidation only receives a Claus tail gas comprising only a limited amount of $H_2S$, the calorific value is too low to maintain a stable combustion. In that situation addition of a support fuel is required. This support fuel may either be $H_2S$, SWS gas or a hydrocarbon feed, but preferably an amount of an existing feedstock gas to the integrated Claus and sulfuric acid plant is used.

The integration between the Claus process and the sulfuric acid process allows for integration benefits. These include the possibility to reduce the volumetric flow in the Claus process, by providing oxidant in the form of sulfuric acid, which can replace atmospheric air. In addition, the use of feedstock gas may be optimized such that feedstock gases comprising fuels contributing highly to sulfur production may be directed to the Claus process, whereas feedstock gases contributing with thermal energy and non-reacting products such as $CO_2$ may be directed to the sulfuric acid process. Where the process is designed for recycle of a too high amount of sulfuric acid, additional fuel may be required for providing the heat required for evaporation and dissociation of sulfuric acid. The size of the plant may even benefit from an increased amount of recycled acid, since the WSA® plant size does not increase significantly with the amount of acid produced, while the Claus plant and the WSA® plant size decrease with a decrease in inert gas flow.

The integration of the two processes also enable a process where the operation of the Claus process is carried out with a low conversion such as 90% or 95%—since it may be cheaper to carry out the additional conversion in a sulfuric acid process compared to the addition of an extra Claus converter stage.

In addition to the WSA® process, sulfuric acid can also be produced in other sulfur abatement processes. A first example is the SNOX process in which selective catalytic reduction of $NO_x$ is integrated with WSA®, this layout being especially favorable for flue gases with less than 1 vol % $SO_2$.

A standard Claus plant layout requires >50 vol % $H_2S$ in the feed gas (excluding the oxidant gas) to be thermally self-sustainable in the Claus reaction furnace. With lower $H_2S$ concentrations, feed gas preheating and so-called split flow configuration is required. Claus plants treating feed gases with <10-20 vol % $H_2S$ are rarely seen. Sulfuric acid processes, on the other hand, very efficiently treat these so-called lean $H_2S$ gases, producing concentrated sulfuric acid. The sulfuric acid product will be highly concentrated in sulfur and oxygen.

A combination of a sulfuric acid plant to treat a lean $H_2S$ (and/or other sulfur compounds) gas in combination with a Claus plant treating a rich $H_2S$ gas and accepting the acid from the sulfuric acid plant will be a beneficial setup as the feed streams to both the Claus plant and sulfuric acid plant are optimal with regard to conversion efficiency, thermal efficiency and plant size/cost.

The coupling between the Claus process and a sulfuric acid processes may also be used to optimize the treating of feeds. Sulfuric acid processes and in particular the WSA® process has the benefit of being well suited for contaminated feeds, including SWS gases comprising ammonia as discussed above, "dirty sulfur" comprising organic impurities and moderate amounts of inorganic impurities, dilute streams of $H_2S$, $SO_2$ and other sulfur compounds, including flue gases from burners and FCC gas. Similarly, rich $H_2S$ gases including waste gases from $CS_2$ processes, which must be diluted before being treated in a WSA® plant, may instead be directed immediately for the Claus process. Also other sulfur rich process streams, e.g. waste streams from coal gasification or from natural gas purification may be directed to one or both stages of the integrated Claus/WSA® process.

FIGURES

FIG. 1 shows an integrated Claus+sulfuric acid process with a single combustor

Figure 2:
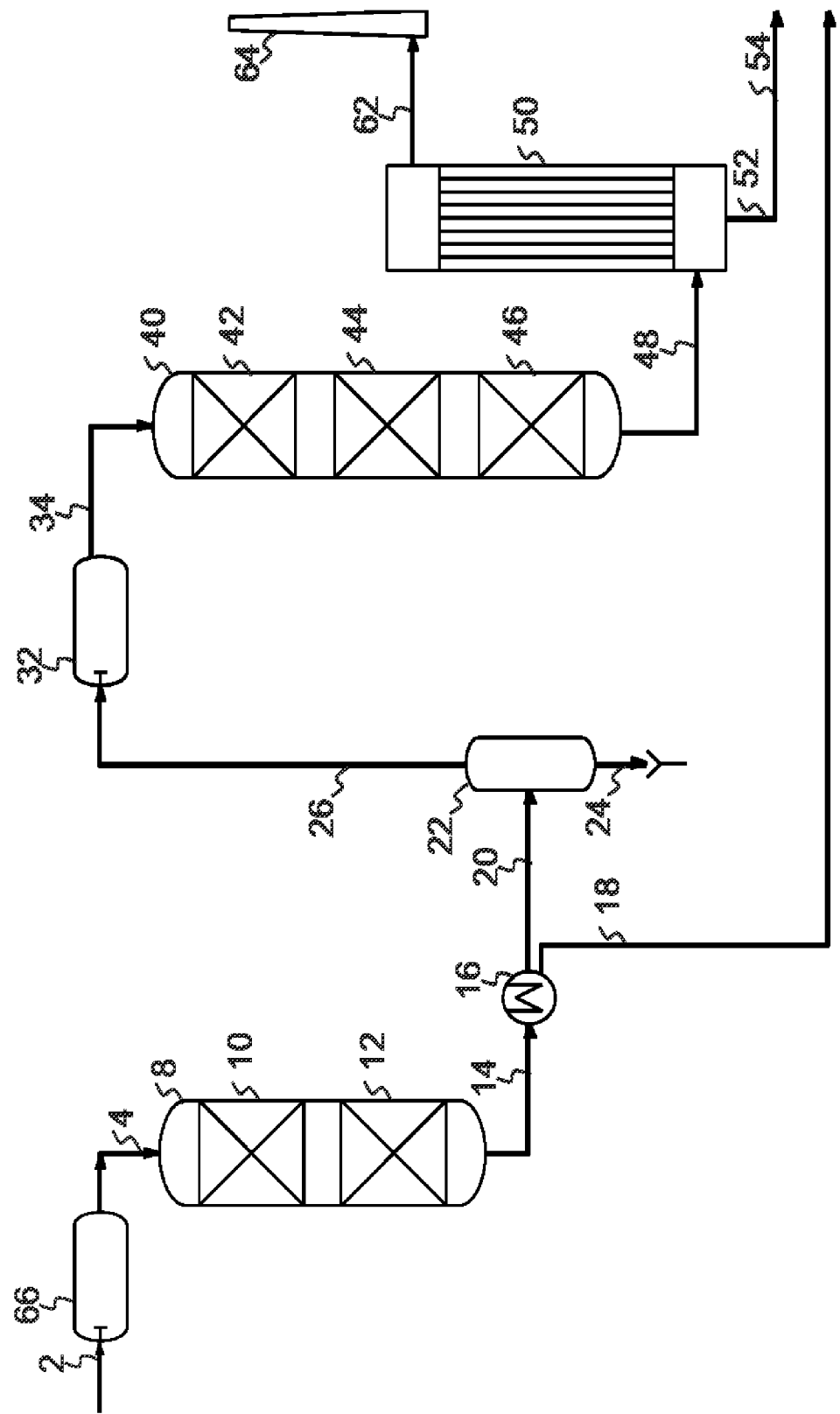
Figure 3:
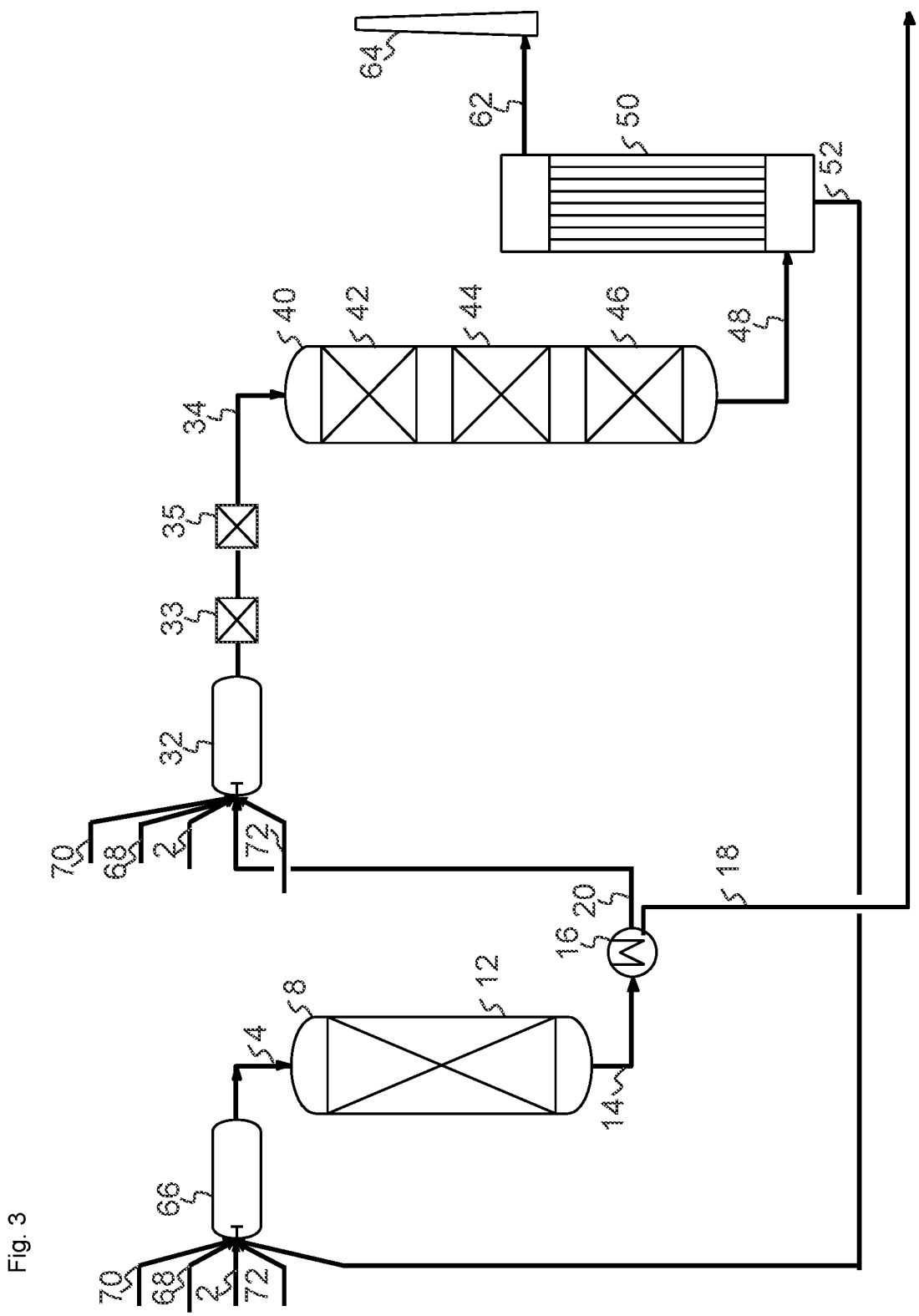

FIG. 2 shows a sequential Claus+sulfuric acid process according to the prior art FIG. 3 shows an integrated Claus+sulfuric acid process with combustion of sulfuric acid in the Claus reaction furnace according to the present disclosure In FIG. 1 an integrated Claus+sulfuric acid process with a single combustor is shown. A feedstock gas 2 rich in $H_2S$ is combined with a gas rich in $SO_2$ 36, and directed as a Claus feed gas 4 to a reactor 8, which, especially if the gas rich in $SO_2$ 36 contains $O_2$, may contain an optional material catalytically active in $H_2S$ oxidation for converting $O_2$ and $H_2S$ into $SO_2$ and $H_2O$ (10), forming an $O_2$ free Claus feed gas. The $O_2$ free Claus feed gas is directed to contact a material catalytically active in the Claus process 12 (i.e. a Claus catalyst) in the same or a further reactor providing a Claus process product 14. The Claus process product 14 is directed to a sulfur condensation unit 16, providing condensed sulfur 18 and a wet Claus tail gas 20. The wet Claus tail gas 20 may optionally be further reacted in the presence of additional material catalytically active in the Claus process followed by further condensation of sulfur, in one to four further Claus stages (not shown here), to provide a final wet Claus tail gas. An aqueous phase 24 may optionally be separated from the wet Claus tail gas 20 in a separator 22, providing a dried Claus tail gas 26. An amount of the dried Claus tail gas comprising $H_2S$ 28 is, optionally together with an amount of sulfuric acid 60, directed to a combustor 32, providing a process gas rich in $SO_2$ 34, which is split in a recycled process gas comprising $SO_2$ 36 and an $SO_2$ converter feed gas 38. An amount of the dried Claus tail gas comprising $H_2S$ 26 may be directed as a recycled dried Claus tail gas 30, to suppress the temperature increase in the reactors by diluting the exothermic reaction mixture. The $SO_2$ converter feed gas 38 is directed to an $SO_2$ converter 40, containing one or more layers or beds of catalytically active material 42, 44, 46 optionally with interbed cooling, from which an $SO_3$ rich gas 48 is withdrawn. As the $SO_3$ rich gas contains water, the $SO_3$ may hydrate to form $H_2SO_4$. $H_2SO_4$ is condensed as concentrated sulfuric acid 52 in a sulfuric acid condenser 50. If the amount of water is insufficient for full hydration of $SO_3$, addition of steam in a position upstream may be preferred. From the sulfuric acid condenser 50 a substantially pure gas 62 may be withdrawn and directed to stack 64. If excess sulfuric acid is produced, an amount 56 may be directed to the combustor 32 for decomposition into $SO_2$, $O_2$ and $H_2O$ and directed via line 36 to the Claus catalyst 12 for formation of elemental sulfur, whereas if the sulfuric acid is required in a nearby process, all sulfuric acid may be withdrawn via line 54. An acid cooling system (not shown) is located between the sulfuric acid condenser outlet and the split of the two acid streams 54 and 56.

In a variation of the process the conversion and condensation of sulfuric acid may be carried out in two stages, where remaining $SO_2$ is oxidized, hydrated and condensed, with the associated benefit of providing increased sulfur removal.

In a further variation the $SO_2$ converter feed gas 38 may be dried, such that the $SO_3$ rich gas 48 will contain little or no water. In that case the sulfuric acid condenser 50 may be replaced with an absorber, in which $SO_3$ may be absorbed in sulfuric acid, to provide concentrated sulfuric acid, by a dry sulfuric acid process.

In a further variation an amount of elemental sulfur may also be transferred to the combustor 32, which will have the effect of providing $SO_2$ to the sulfuric acid process without introduction of water, which may be beneficial if it is desired to increase the $SO_3$ concentration, which may be beneficial in a dry sulfuric acid process.

In a further variation, an amount of the feedstock gas 2 rich in $H_2S$ may also be split in an amount directed for the reactor of the Claus process 8 and an amount directed to the combustor 32, for oxidation.

In a further variation, an amount of fuel gas is directed to combustor 32 in order to be able to sustain a stable flame and a sufficiently high temperature for complete oxidation of reduced species, such as $H_2S$, CO, $H_2$, COS, present in the final Claus tail gas 26.

In FIG. 2 a process for production of sulfur and sulfuric acid according to the prior art is shown. Here a feedstock gas 2 rich in $H_2S$ is directed to a Claus process, from which the Claus tail gas 26 is directed to a sulfuric acid process. The feedstock gas 2 rich in $H_2S$ is directed to a Claus reaction furnace 66 converting an amount of the of $H_2S$ to $SO_2$, to form a Claus converter feed gas 4 having a ratio between $H_2S$ and $SO_2$ close to 2:1. The Claus converter feed gas 4 is directed to a converter 8 containing a material catalytically active in the Claus reaction 12, providing a Claus process product 14. The Claus process product 14 is directed to a sulfur condensation unit 16, providing condensed sulfur 18 and a Claus tail gas 20. The wet Claus tail gas 20 is typically further reacted in the presence of additional material catalytically active in the Claus reaction followed by further condensation of sulfur, in one to four further Claus stages (not shown here), to provide a final wet Claus tail gas. An aqueous phase 24 may optionally be separated from the wet Claus tail gas 20 in a separator 22, providing a dried Claus tail gas 26 which is directed to a combustor 32, providing a $SO_2$ converter feed gas 34. The $SO_2$ converter feed gas 34 is directed to an $SO_2$ converter 40, containing one or more beds (layers) of catalytically active material 42, 44, 46 optionally with interbed cooling, from which an $SO_3$ rich gas 48 is withdrawn. As the $SO_3$ rich gas contains water, the $SO_3$ may hydrate to form $H_2SO_4$. $H_2SO_4$ is condensed as concentrated sulfuric acid 52 in a sulfuric acid condenser 50. From the sulfuric acid condenser 50 a substantially pure gas 62 may be withdrawn and directed to stack 64.

In order to maintain a stable flame and sufficient high temperature for complete oxidation of $H_2S$, CO, $CS_2$, COS and $H_2$, fuel gas may be directed to the combustor 32. Oxygen is also supplied, typically via air, in order to supply oxygen for both the combustion reactions in combustor 32 but also the oxygen required for the oxidation of $SO_2$ in the $SO_2$ converter. To reduce fuel consumption, the oxygen for $SO_2$ oxidation can be added between the combustor 32 outlet and the $SO_2$ converter 40 inlet.

In FIG. 3 an integrated Claus+sulfuric acid process with combustion of sulfuric acid in the Claus reaction furnace 66 according to the present disclosure is shown. A feedstock gas 2 rich in $H_2S$, sulfuric acid 52, a gas rich in oxygen 72, optionally a gas comprising a fuel 68 and optionally, a second feedstock gas 70 rich in $H_2S$ and $NH_3$ are directed to a Claus reaction furnace 66 and the combustion product is directed as an $O_2$ free Claus converter feed gas 4 to a converter 8. Between the outlet of the Claus reaction furnace 66 and Claus converter inlet 8, a waste heat boiler (not shown) is typically installed to reduce the temperature to the optimal working temperature for the Claus catalyst, optionally also withdrawing elemental sulfur formed in the Claus reaction furnace 66. The $O_2$ free Claus converter feed gas 4 is directed to contact a material catalytically active in the Claus reaction 12 providing a Claus process product 14. The Claus process product 14 is directed to a sulfur condensation unit 16, providing condensed sulfur 18 and a Claus tail gas 20. The Claus tail gas 20 may optionally be further reacted in the presence of additional material catalytically active in the Claus process followed by further condensation of sulfur, in one to four further Claus stages (not shown here), to provide a final Claus tail gas. An amount of the final Claus tail gas comprising $H_2S$ 20 is directed to a means for Claus tail gas oxidation 32, providing an $SO_2$ converter feed gas 34. To ensure oxidation of the compounds in the Claus tail gas, an $O_2$ rich gas 72 is directed to the combustor 32.

The $SO_2$ converter feed gas is typically cooled in a waste heat boiler (not shown) to provide optimal temperature for the first catalyst layer 42 in the $SO_2$ converter 40. The $SO_2$ converter feed gas 34 is directed to an $SO_2$ converter 40, containing one or more beds/layers of catalytically active material 42, 44, 46 optionally with interbed cooling, from which an $SO_3$ rich gas 48 is withdrawn. As the $SO_3$ rich gas contains water, the $SO_3$ may hydrate to form $H_2SO_4$. $H_2SO_4$ is condensed as concentrated sulfuric acid 52 in a sulfuric acid condenser 50. If the amount of water is insufficient for full hydration of $SO_3$, addition of steam in a position upstream the sulfuric acid condenser 50 may be preferred. From the sulfuric acid condenser 50 a substantially pure gas 62 may be withdrawn and directed to stack 64. Typically, all sulfuric acid 52 is recycled to the Claus reaction furnace 66, but optionally an amount of sulfuric acid may be withdrawn for other process purposes.

In a further embodiment the conversion and condensation of sulfuric acid may be made in two stages, where remaining $SO_2$ from the first stage is further oxidized, hydrated and condensed, with the associated benefit of providing increased sulfur removal.

In a further embodiment, additional $SO_2$ conversion can be achieved by installed a tail gas cleaning plant downstream the sulfuric acid process. Numerous of these tail gas solutions exist, where alkaline scrubbers optionally combined with mist filters, are the most common type. Scrubbers using $H_2O_2$ or $NH_3$ are preferred as the effluent from these scrubbers is $H_2SO_4$ and $(NH_4)_2SO_4$ respectively, both of which can be recycled to the Claus reaction furnace for thermal destruction, i.e. eliminating a waste stream.

In a further embodiment the $SO_2$ converter feed gas 34 may be dried, such that the $SO_3$ rich gas 48 will contain little or no water. In that case the sulfuric acid condenser 50 may be replaced with an absorber, in which $SO_3$ may be absorbed in sulfuric acid, to provide concentrated sulfuric acid, by a dry sulfuric acid process.

In a further embodiment an amount of elemental sulfur may also be transferred to the combustor 32, which will have the effect of providing $SO_2$ to the sulfuric acid process without introduction of water, which may be beneficial if it is desired to increase the $SO_3$ concentration, which may be beneficial in a dry sulfuric acid process.

In a further embodiment an amount of fuel gas 68 is directed to the means for Claus tail gas oxidation 32 to ensure sufficiently high temperature for complete oxidation of all reduced compounds in the Claus tail gas 20.

In a further embodiment, an amount of the feedstock gas 2 rich in $H_2S$ may also be split in an amount directed for the combustor of the Claus process (i.e. the Claus reaction furnace) 66 and an amount directed to the means for Claus tail gas oxidation 32. This will reduce the need for fuel gas addition to the means for Claus tail gas oxidation 32.

In a further embodiment, the entire amount of second feedstock containing $NH_3$ and $H_2S$ 70 is directed to the means for Claus tail gas oxidation 32, eliminating the risk of $NH_3$-salt formation in the sulfur condensation units (i.e. the Claus condensers) 16. In this embodiment a system for reduction of $NO_X$ 33, located between the means for Claus tail gas oxidation 32 outlet and the inlet of the $SO_2$ converter 40 will be installed. Typically, a so-called SCR (Selective Catalytic Reaction) catalytic reactor will be used, requiring addition of $NH_3$ for the SCR reaction to proceed. The $NH_3$ addition can be from an external source or could be a small stream of the second feedstock containing $NH_3$ and $H_2S$ 70, which is then bypassed the means for Claus tail gas oxidation.

In a further embodiment a for catalytic reactor 35 for oxidation of remaining impurities such as hydrocarbons, CO, COS, $CS_2$, S and $H_2S$ may be installed.

In a further embodiment a part of the Claus tail gas 20 is bypassed the means for Claus tail gas oxidation 32 and combined with the hot off gas 34 from the means for Claus tail gas oxidation in a gas mixing point just downstream the means for Claus tail gas oxidation. This reduces the amount of fuel gas 68 needed for the means for Claus tail gas oxidation to maintain a sufficiently high temperature. The combined means for Claus tail gas oxidation off gas and bypassed Claus tail gas must have a mixed gas temperature in excess of 400° C. to ensure homogeneous (i.e. gas phase) oxidation of $H_2S$. To ensure complete oxidation of "difficult" species such as COS and CO, an optional oxidation catalyst 35 can be installed between the gas mixing point and inlet to the $SO_2$ converter 40. To ensure optimal control of the temperature to the oxidation catalyst, a waste heat boiler or any other heat exchanger can be installed between the gas mixing point and inlet to the oxidation catalyst. The oxidation catalyst typically comprises a noble metal such as Pt or Pd.

In a further embodiment the gas comprising oxygen 72 may be pure oxygen or atmospheric air enriched in oxygen, such that it comprises less than 50%, 20%, 10% or even 1% $N_2$+Ar.

EXAMPLES 1-3

Three examples have been investigated by process modelling of a typical Claus feed, which includes hydrocarbons, without immediate relevance to the present invention.

The feedstock gas (2), is a rich $H_2S$ gas from a refinery and has the following composition:
Feedstock gas flow: 1593 $Nm^3/h$
$H_2S$ concentration: 91.6 vol %
$H_2O$ concentration: 3.7 vol %
$H_2$ concentration: 1.9 vol %
$CO_2$ concentration: 2.8 vol %

Example 1 relates to a process as illustrated in FIG. 1, in which it is desired to convert 70% of the $H_2S$ to elemental sulfur and the remaining 30% to sulfuric acid. This example will require only a single combustor, and the volume of gas treated in the Claus section will be 67% of volume of gas treated in the sulfuric acid section.

Example 2 relates to a process as illustrated in FIG. 1, in which it is desired to convert 100% of the $H_2S$ to elemental sulfur by recycle of all sulfuric acid produced. This example will also require only a single combustor. Since more sulfur has to be formed, the flows around the Claus catalyst and condenser section has been increased, whereas the flow to the sulfuric acid process has been slightly decreased.

Example 3 relates to a process according to the prior art as illustrated in FIG. 2, in which it is desired to convert 70% of the $H_2S$ to elemental sulfur and the remaining 30% to sulfuric acid. Such process may be configured with a single Claus stage, but will require a Claus reaction furnace as well as a means for Claus tail gas oxidation. Compared to example 1, the process gas flows through the once-through process is lower in the Claus section and similar in the sulfuric acid section. The cost of a larger Claus reactor and sulfur condenser is small compared to the cost of Claus reaction furnace and waste heat boiler as in the prior art.

It is clear from the above examples, that integration of the Claus process and the WSA® process, significant equipment cost savings are possible. The integration may avoid the requirement of a combustor, and in addition the number of Claus stages may also be reduced.

EXAMPLES 4-7

Four further examples have been analyzed for the process shown in FIG. 3, in comparison with the process of prior art as shown in FIG. 2.

These examples are based on the following feedstock gases:
Feed stock gas rich in $H_2S$ (stream 2 in FIGS. 2 and 3):
Total gas flow: 8190 $Nm^3/h$
$H_2S$ concentration: 94 vol %
$H_2O$ concentration: 6 vol %

The rich $H_2S$ gas is typical for refineries, and will also contain varying amounts of light hydrocarbons.

Feed stock gas rich in $H_2S$ and $NH_3$ (stream 70 in FIGS. 2 and 3):
Total gas flow: 3669 $Nm^3/h$
$H_2S$ concentration: 28 vol %
$NH_3$ concentration: 45 vol %
$H_2O$ concentration: 27 vol %

These streams comprising $H_2S$ and $NH_3$ are typically waste gases from so-called sour water strippers and recognized as SWS-gases. They may also contain varying amounts of light hydrocarbons.

The fuel gas is a light hydrocarbon mixture (primarily $CH_4$), with a lower heating value of 12,200 $kcal/Nm^3$.

Feed streams, combustion air and Claus tail gas are preheated to the extent possible by utilizing heat evolved in the combined Claus+sulfuric acid processes.

In these examples the Claus process operates with 94-95% recovery of sulfur from the feed, i.e. can be a well operated Claus plant with only 2 catalytic stages.

EXAMPLE 4: SEQUENTIAL CLAUS+SULFURIC ACID PROCESS ACCORDING TO PRIOR ART

In example 4 all feed streams are treated in the Claus process, providing a stream of 11.7 t/h elemental sulfur and a Claus tail gas comprising ~5% of the S in the feed gases. In the means for Claus tail gas oxidation, the sulfur species present in the Claus tail gas are oxidized and fuel gas is provided to maintain a combustor temperature of 1,000° C., such that all reduced species, such as CO, COS, $H_2$, $H_2S$, $S_x$, and $CS_2$, are fully oxidized to $CO_2$, $H_2O$ and $SO_2$.

The production of concentration sulfuric acid is 2.4 t/h, calculated as 100% w/w $H_2SO_4$.

The total sulfur and sulfuric acid recovery is >99.9% of the S in the feed, in compliance with even strict environmental legislation.

EXAMPLE 5, RECYCLE OF $H_2SO_4$ TO CLAUS REACTION FURNACE

In this example $H_2SO_4$ is not desired as a product and the entire acid production from the sulfuric acid process is recycled to the Claus reaction furnace. The amount of $H_2SO_4$ recycle corresponds to ~6% of the total S in the feed streams.

The total elemental sulfur product flow is now equal to the S in the feed streams, corresponding to 107% of the base case as described in example 4.

The temperature in the Claus reaction furnace decreases by −200° C. due to the evaporation and decomposition of the $H_2SO_4$, but the temperature is still well above the minimum for complete burnout of hydrocarbons and $NH_3$. No fuel gas is needed in the Claus reaction furnace.

As $H_2SO_4$ is an excellent $O_2$ carrier, the combustion air requirements decrease and thus the process gas volume decreases as the flow of inert $N_2$ decreases. Overall the process gas flow out of the Claus reaction furnace decreases to 94% of the base flow and the process gas flow out of the means for Claus tail gas oxidation decreases to 93% due to this reduction in $N_2$ flow. As less process gas needs to be heated to 1,000° C. in the means for Claus tail gas oxidation, the fuel gas consumption is only 92% of the base case.

The benefit of recycling $H_2SO_4$ has been found surprisingly high as not only has the sulfur forming capacity of the Claus plant increased by 7% but at the same time the process gas volume has been decreased by 6-7%. This corresponds to a Claus plant capacity increase of ~15%, provided that the process gas flow is at 100% of the base case.

EXAMPLE 6, RECYCLE OF $H_2SO_4$ TO CLAUS REACTION FURNACE AND SWS GAS BYPASS TO MEANS FOR CLAUS TAIL GAS OXIDATION

In this example, fuel gas consumption in the means for Claus tail gas oxidation has been minimized by bypassing a fraction of the SWS gas to the means for Claus tail gas oxidation. The SWS gas has a high heating value and can easily act as a fuel gas. The concentrated $H_2S$ feed gas could also have been used, but since the SWS gas can be problematic in the Claus process and is unproblematic in the WSA® process, the bypassing of SWS gas has greater benefits than bypassing the $H_2S$ gas. Process gas wise there will also be a reduction in gas volume as the $NH_3$ in the SWS gas will increase the process gas volume in the Claus process due to the oxygen (air) requirements for combustion of $NH_3$ to $N_2$ and $H_2O$.

The amount of SWS gas recycled is adjusted such that 1,000° C. is achieved in the means for Claus tail gas oxidation, ensuring complete burnout of reduced species from the Claus tail gas, such as $H_2S$, COS, CO, $H_2$, $S_X$ and $CS_2$.

Since the fuel gas in the means for Claus tail gas oxidation now contains $H_2S$, the $H_2SO_4$ production will increase, now accounting for ~13% of the S in the feed streams. This large amount of sulfuric acid recycle result in a significant reduction in Claus reaction furnace temperature.

With proper feed stream preheating it is still possible to achieve sufficiently high temperature in the Claus reaction furnace without needing support fuel.

The effect on the size of the Claus process is substantial: the process gas volume is reduced to 65% of the base case, still with 107% elemental sulfur production. This process gas volume reduction can be either used for capacity boosting of an existing plant or significant cost reduction of a new plant.

Also the sulfuric acid plant will become smaller as the process gas flow is only 90% of the base case flow. This is surprising as the $H_2SO_4$ production has been more than doubled compared to the base case, but it is mainly due to the large reduction in Claus tail gas flow.

What is most remarkable is the reduction in fuel gas consumption that is now only 16% of the base case flow, contributing to a significantly lower operational cost of the integrated Claus+sulfuric acid process.

EXAMPLE 7, RECYCLE OF $H_2SO_4$ AND COMPLETE BYPASS OF SWS GAS TO MEANS FOR CLAUS TAIL GAS OXIDATION

This example focus on the complete elimination of the SWS gas to the Claus plant, ensuring that ammonia salt formation in the sulfur condensers is impossible and thus decreases the risk of failure of the Claus plant.

The process gas flow out of the Claus reaction furnace is 69% of the base case, but a little higher compared to example 6 where only a fraction of the SWS gas is bypassed. The increase in process gas flow is due to requirement of fuel gas addition to the Claus reaction furnace to maintain the high operating temperature.

The $H_2SO_4$ production in the WSA® plant has now increased to 17% of the S in the feed gases, recycling of the entire production now quenches the Claus reaction furnace temperature to an extent where fuel gas is required. The process gas from the means for Claus tail gas oxidation has increased to 107% of the base case, due to the increased sulfur feed to the sulfuric acid plant.

Even if fuel gas is needed in the Claus reaction furnace, the total flow of fuel gas is only 41% of the base case.

From a plant size and operational cost point of view, this example seems less optimal than example 6, i.e. there is an optimum of $H_2SO_4$ recycle ratio which depends on the actual feed gas flows and compositions. Bypassing even more feed stock gas will result in an increased sulfuric acid production, which will quench the Claus reaction furnace even more which again will require more fuel gas and therefore the Claus tail gas flow will increase.

For the feed gas compositions and flows described above, the optimum with regard to plant sizes and fuel consumption is with a $H_2SO_4$ recycle flow between 13% and 17% of the S feed in the feed streams.

In general, the optimal feed stock gas bypass is close to the point where the Claus reaction furnace operates at the minimum allowable temperature, i.e. the feed stock can be bypassed to produce more sulfuric acid until the Claus reaction furnace temperature reaches the limit for thermal destruction of hydrocarbons and sulfuric acid. Increasing the feed stock bypass ratio will reduce the fuel gas need in the means for Claus tail gas oxidation, but will increase the fuel gas consumption in the Claus reaction furnace by a much larger ratio as the fuel gas in the Claus reaction furnace need to evaporate and decompose the sulfuric acid and heat up the process gas, whereas in the means for Claus tail gas oxidation only heating up of process gas is required.

For a feed stock gas with e.g. 50 vol % $H_2S$, the optimal $H_2SO_4$ recycle flow is ~7% of the S feed in the feed stream. The acid gas bypass to the means for Claus tail gas oxidation is only 2% as the relatively low $H_2S$ concentration result in a low temperature in the Claus reaction furnace and thus the sulfuric acid will quickly reduce the temperature and require fuel gas addition in the Claus reaction furnace. Using $O_2$ enriched air in the Claus reaction furnace will allow for a higher $H_2SO_4$ recycle flow.

EXAMPLE 8, RECYCLE OF $H_2SO_4$, BYPASS OF SWS GAS TO MEANS FOR CLAUS TAIL GAS OXIDATION AND USE OF $O_2$ ENRICHED AIR

To boost Claus plant capacity, a well-known revamp option is to install special burners which can handle enriched air with >21 vol % $O_2$, a common $O_2$ quality is 93-99 vol % $O_2$.

In this example an enriched air with 80 vol % $O_2$ is used as in the Claus process, whereas atmospheric air is used in the sulfuric acid process.

The effect of the enriched air is a significantly reduced process gas flow out of the Claus reaction furnace, mainly due to the reduced amount of $N_2$ associated with the $O_2$ flow. Also the lower process gas flow enables operation of the Claus reaction furnace without fuel addition, as less inert gas has to be heated.

Since the process gas flow out of the Claus reaction furnace is now reduced to only 38% of the base case, the Claus tail gas feed to the means for Claus tail gas oxidation is also significantly decreased. The process gas out of the means for Claus tail gas oxidation is only 56% of the base case, it is relatively higher than the Claus plant flow due to the large amount of SWS gas bypass to the WSA® plant.

With this layout it is possible to operate without fuel gas in both Claus and sulfuric acid processes, even with this high recycle flow of $H_2SO_4$ from the sulfuric acid process.

EXAMPLE 9, EFFECT OF $H_2SO_4$ CONCENTRATION OF THE RECYCLED SULFURIC ACID ON CLAUS PLANT OPERATION

In this example the effect of sulfuric acid concentration is demonstrated by comparing with a concentrated sulfuric acid comprising 45% $H_2SO_4$.

The conditions in the example correspond to those of Example 6, i.e. a fraction of SWS gas is bypassed to the means for Claus tail gas oxidation to reduce fuel gas consumption. However, as the Claus plant receives a less concentrated sulfuric, more energy in the form of SWS gas, is required in the Claus combustor for evaporation of $H_2SO_4$ and $H_2O$. The higher SWS gas flow results in higher combustion air flow and thus a higher process gas flow. In addition to that, the water in the sulfuric acid stream also significantly increases the process gas flow; the water accounts for ~15% of the total process gas flow (in example 6, the water from the acid stream accounts for only ~2% of the total process gas flow).

The higher process gas flow from the Claus plant requires additional energy input in the means for Claus tail gas oxidation, and as the SWS gas flow is limited due to consumption in the Claus reaction furnace, a substantial fuel gas flow is required to maintain a high temperature.

Comparing the data in Table 2, it is seen that the Claus and Claus tail gas synergy is significantly reduced in example 9, when comparing with the highly concentrated sulfuric acid recycling in example 6.

The amount of energy addition required for the Claus reaction furnace receiving less concentrated sulfuric acid may be reduced if the amount of acid recirculated is reduced, but this would require increased Claus process efficiency, which could mean an additional Claus conversion stage.

In conclusion, Examples 4-9 demonstrate that integration of the Claus process with the WSA® or another sulfuric acid process allows optimization of the related process costs. This may involve a reduced Claus process volume and a reduced amount of support fuel. Especially if the concentration of recycled sulfuric acid is above 60%, 80% or 90% the integrated process is highly efficient.

TABLE 1

Process calculations for a Claus + WSA ® layout as shown in FIG. 1

|  | Example 1 | Example 2 | Example 3 |
|---|---|---|---|
| Sulfur production | 70% | 100% | 70% |
| H2SO4 production | 30% | 0% | 30% |
| H2SO4 recycle to combustor | 0% |  | 0% |
| Process gas to Claus reactor | 6,300 Nm³/h | 4,400 Nm³/h | 9,700 Nm³/h |
| Claus tail gas | 11,450 Nm³/h | 6,800 Nm³/h | 9,200 Nm³/h |
| Process gas to SO2 converter | 4,400 Nm³/h | 3,000 Nm³/h | 9,600 Nm³/h |

TABLE 2

Process calculations for a Claus + WSA ® layout as shown in FIG. 3

|  | Example 4 | Example 5 | Example 6 | Example 7 | Example 8 | Example 9 |
|---|---|---|---|---|---|---|
| Claus burner air $O_2$ content | 21% | 21% | 21% | 21% | 75% | 21% |
| Sulfur production | 100% | 107% | 107% | 107% | 107% | 107% |
| H2SO4 production | 6% | No | No | No | No | No |
| H2SO4 recycle | 0% | 6% | 13% | 17% | 13% | 9% |
| $H_2SO_4$ concentration | 93% | 93% | 93% | 93% | 93% | 45% |
| Acid gas feed to Claus | 100% | 100% | 100% | 100% | 100% | 100% |
| SWS gas feed to Claus | 100% | 100% | 33% | 0% | 19% | 79% |
| Process gas out Claus reaction furnace | 100% | 94% | 65% | 69% | 38% | 97% |
| Process gas out means for Claus tail gas oxidation | 100% | 93% | 90% | 107% | 56% | 97% |
| Fuel gas consumption | 100% | 92% | 16% | 41% | 0% | 79% |

The invention claimed is:

1. A process for production of sulfur from a feedstock gas comprising 30 vol % 100 to vol % $H_2S$ and a recycled stream of sulfuric acid, the process comprising:
   a. providing a Claus reaction furnace feed stream comprising said feedstock gas, an amount of recycled sulfuric acid, an amount of oxygen and optionally an amount of fuel, wherein the amount of oxygen is substoichiometric;
   b. directing said Claus reaction furnace feed stream to a Claus reaction furnace operating at elevated temperature, providing a Claus converter feed gas;
   c. cooling said Claus converter feed gas to provide a cooled Claus converter feed gas and optionally an amount of elemental sulfur;
   d. directing said cooled Claus converter feed gas to contact a material catalytically active in the Claus reaction;
   e. withdrawing a Claus tail gas and elementary sulfur, optionally by cooling the effluent from said material catalytically active in the Claus reaction;
   f. directing a stream comprising said Claus tail gas, oxygen and a fuel as a feedstock gas to a means for Claus tail gas oxidation operating at a temperature above 900° C. and/or a catalytic means for oxidation providing an $SO_2$ converter feed gas;
   g. directing said $SO_2$ converter feed gas to contact a material catalytically active in $SO_2$ oxidation to $SO_3$, providing an $SO_3$ rich gas; and
   h. converting said $SO_3$ rich gas to concentrated sulfuric acid and a $SO_3$ depleted gas, either by absorption of $SO_3$ in sulfuric acid or by hydration of $SO_3$, cooling and condensation of sulfuric acid,
   wherein said recycled stream of sulfuric acid comprises an amount of said concentrated sulfuric acid and wherein the concentrated sulfuric acid contains from 90% w/w to 98.5% w/w $H_2SO_4$.

2. The process according to claim 1 wherein the Claus reaction furnace feed stream comprises less than 0.1 wt % non-elemental nitrogen.

3. The process according to claim 1 further wherein the Claus reaction furnace feed stream comprises less than 50 vol % $N_2$.

4. The process according to claim 1 wherein the $H_2S:SO_2$ ratio of said Claus tail gas is below 2.

5. The process according to claim 1 wherein the $H_2S:SO_2$ ratio of said Claus tail gas is above 2.

6. The process according to claim 1 further comprising the step of directing an amount of a further feedstock gas to said means for Claus tail gas oxidation.

7. The process according to claim 6 wherein said further feedstock gas comprises more than 5 vol % non-elemental nitrogen.

8. The process according to claim 6 wherein the amount of sulfur in the further feedstock gas is at least 1 wt % of the total amount of elemental sulfur withdrawn from the process.

9. The process according to claim 1 wherein the material catalytically active in the Claus reaction comprises activated aluminum(III) or titanium(IV) oxide.

10. The process according to claim 1 wherein the amount of sulfur in the recycled stream of sulfuric acid is higher than 1 wt % and less than 25 wt % of the total amount of elemental sulfur withdrawn from the process.

11. The process according to claim 1 wherein the recycled stream of sulfuric acid is atomized in said Claus reaction furnace either using two fluid nozzles driven by compressed air, $N_2$ or steam or using hydraulic nozzles and wherein the residence time in the Claus reaction furnace is from 1.5 second to 4 seconds.

12. The process according to claim 1 wherein the molar ratio $H_2S:O_2$ of the combined streams directed to the Claus reaction furnace is greater than 2.5.

13. The process according to claim 1 wherein the molar ratio $H_2S:O_2$ of the combined streams directed to the Claus reaction furnace corrected for other oxygen consuming species in the feedstock and corrected for products of incomplete oxidation in the Claus tail gas is greater than 2.1.

14. The process according to claim 1 wherein an amount of gas in the process is optionally cooled and directed to an upstream position for controlling a process temperature.

15. The process according to claim 1 wherein one or more streams directed to said Claus reaction furnace are pre-heated by heat exchange with a hot process stream.

16. The process according to claim 1 wherein one or more streams directed to said means for Claus tail gas oxidation are pre-heated by heat exchange with a hot process stream.

17. The process according to claim 1 wherein said material catalytically active in $SO_2$ oxidation to $SO_3$ comprises vanadium.

18. The process according to claim 1 wherein condensation of sulfuric acid according to step (h) is carried out in a condenser where cooling medium and $SO_3$ rich gas is separated by glass.

19. The process according to claim 1 wherein the amount of recycled sulfuric acid is selected such that the temperature in the Claus reaction furnace is from 800° C. to 1500° C., without addition of support fuel to the Claus reaction furnace.

20. The process according to claim 1, wherein, in (b), the Claus reaction furnace feed stream is directed to a Claus reaction furnace operating at a temperature above 900° C.

21. A process plant comprising a Claus reaction furnace, a means of Claus gas cooling, a Claus conversion section, a means for Claus tail gas oxidation and a sulfuric acid section, wherein
   the Claus reaction furnace has an inlet, an outlet, and one or more atomization nozzles configured for adding sulfuric acid to the Claus reaction furnace as droplets,
   the means of Claus gas cooling has a gas inlet, a gas outlet and an elemental sulfur outlet,
   the Claus conversion section has a gas inlet, a gas outlet and an elemental sulfur outlet,
   the means for Claus tail gas oxidation has a Claus tail gas inlet, a Claus tail gas oxidant inlet, an optional fuel inlet and optionally a further feedstock inlet and an outlet and
   the sulfuric acid section has a gas inlet, a gas outlet and a sulfuric acid outlet, and wherein the inlet of the Claus reaction furnace is configured for receiving a feedstock gas, sulfuric acid and a Claus reaction furnace oxidant, and
   the outlet of the Claus reaction furnace is configured for being in fluid communication with the inlet of the means of Claus gas cooling,
   wherein the outlet of the means of Claus gas cooling is configured for being in fluid communication with the inlet of the Claus conversion section and wherein the Claus tail gas inlet of the means for Claus tail gas oxidation is configured for being in fluid communication with the outlet of said Claus conversion section gas outlet, the process gas outlet of the means for Claus tail gas oxidation is configured for being in fluid communication with the inlet of the sulfuric acid section, and the sulfuric acid outlet of the sulfuric acid section being in fluid communication with the inlet of said Claus reaction furnace.

22. The process plant according to claim 21, wherein said sulfuric acid section comprises a sulfur dioxide oxidation reactor having an inlet and an outlet and a sulfuric acid condenser having a process side having a process gas inlet, a process gas outlet and a sulfuric acid outlet and a cooling medium side, having a cooling medium inlet and a cooling medium outlet, and wherein the sulfuric acid condenser is configured for at least one of the Claus reaction furnace oxidant and the Claus tail gas oxidant to be pre-heated by being directed to the inlet of the cooling medium side of the sulfuric acid condenser and being withdrawn from the outlet of the cooling medium side of the sulfuric acid condenser.

23. The process plant according to claim 21 further comprising at least one heat exchanger having a hot heat exchanger side and a cold heat exchanger side, configured for the cold heat exchanger side pre-heating one of said feedstock gas, sulfuric acid and oxidant prior to being directed to said Claus reaction furnace and for the hot heat exchanger side being configured for cooling a hot process stream.

24. The process plant according to claim 23 wherein the hot process stream is taken from the group consisting of the stream of the outlet from the means for means for Claus tail gas oxidation, the stream of the outlet from the Claus reaction furnace and the stream of the outlet from the sulfur dioxide oxidation reactor.

25. The process plant according to claim 21 wherein the Claus reaction furnace comprises two or more atomization nozzles, configured for adding sulfuric acid to the Claus reaction furnace as droplets.

26. The process plant according to claim 21 further comprising a means of $SO_3$ reduction, having an inlet and an outlet configured for the inlet of the means of $SO_3$ reduction being in fluid communication with the outlet of the Claus reaction furnace and for the outlet of the means of $SO_3$ reduction being in fluid communication with the inlet of the Claus conversion section.

27. The process plant according to claim 21, wherein the one or more atomization nozzles is a fluid atomization nozzle(s), or a hydraulic atomization nozzle(s).

* * * * *